United States Patent [19]
Kaeser et al.

[11] 3,777,250
[45] Dec. 4, 1973

[54] FILTER FOR REPLACING NOTCHES IN ELECTRIC WAVES

[75] Inventors: Ernst K. Kaeser; Allois F. Geiersbach, both of Milwaukee; Manfred E. Neumann, New Berlin, all of Wis.

[73] Assignee: Allis-Chalmers Corporation, Milwaukee, Wis.

[22] Filed: May 7, 1973

[21] Appl. No.: 358,135

[52] U.S. Cl. .................. 321/9 R, 321/61, 321/69 R, 328/162, 328/165
[51] Int. Cl. ............................................. H02m 1/12
[58] Field of Search ................. 321/5, 9 A, 10, 18, 321/61, 69 R; 333/70, 76; 328/162, 165, 166, 167

[56] References Cited
UNITED STATES PATENTS

| | | | |
|---|---|---|---|
| 2,621,287 | 12/1952 | Hings | 328/167 X |
| 2,834,879 | 5/1958 | Bauman | 328/167 X |
| 2,959,738 | 11/1960 | Nagai | 328/167 |
| 3,419,785 | 12/1968 | LaFuze | 321/5 X |
| 3,686,558 | 8/1972 | Havas et al. | 321/69 R X |
| 3,713,011 | 1/1973 | Johnson et al. | 321/18 X |

OTHER PUBLICATIONS

Pelly, Brian R., Thyristor Phase-Controlled Converters and Cycloconverters, Wiley-Interscience, 1971, Chapter 13.

Primary Examiner—William M. Shoop, Jr.
Attorney—Lee H. Kaiser et al.

[57] ABSTRACT

A wave filter arrangement reproduces the output voltage from a generator on a reduced scale with any notches in the generator output voltage caused by flow of current through the generator impedance replaced in the replica wave. A stepdown current transformer derives a reduced magnitude replica of the current flowing through the generator, a stepdown potential transformer generates a reduced magnitude replica of the output voltage from the generator, and an auxiliary inductance, which is a scale model of the generator subtransient reactance, is connected across the current transformer secondary winding so that the replica of the generator voltage and the voltage drop across the auxiliary inductance are additive and remove notches and other distortions from the reduced scale reproduction of the generator voltage.

19 Claims, 7 Drawing Figures

FILTER FOR REPLACING NOTCHES IN ELECTRIC WAVES

BACKGROUND OF THE INVENTION

1. Field of the Invention

This invention relates to electric wave filters and in particular to an electric wave filter arrangement for deriving a replica of the output voltage from an electrical power source and for removing from the replica voltage commutation notches and other distortions which exist in the source output voltage as a result of current flow through the impedance of the source.

2. Prior Art

In order to reduce the harmonic content of the output wave of a cycloconverter, the firing signals to the thyristors (controlled rectifiers) are regulated in such a way that the output voltage contains a large fundamental component and a small ripple content. This is accomplished by deriving the firing signals from two sources, namely by mixing the high frequency voltage of the supply generator and the low frequency voltage of the reference frequency supply. By use of suitable phase relationships, a nearly linear transfer from reference to average output voltage can be obtained.

If controlled rectifiers (SCR's) of the same (positive current or negative current) SCR group of a cycloconverter connected to different phase busses of the supply generator conduct simultaneously, a short circuit exists across the generator terminals which results in a commutation notch in the supply generator voltage as a result of the voltage drop caused by the flow of short circuit current through the impedance of the generator windings. Such commutation notches and other distortions in the supply generator voltage can result in change of the firing angles of the cycloconverter SCR's. The design of an LRC electric wave filter to remove distortions and noise in the supply generator voltage is made difficult due to the large value of generator current, and removal of the commutation notches in the generator supply voltage is impossible since they are caused by the SCR's. Further, conventional LRC filters produce phase shifts and amplitude variations which are sensitive to change in frequency and to the position and width of the commutation notches and result in undesired variation in firing angles of the SCR's of the cycloconverter.

It is an object of the invention to provide an improved wave filter arrangement for reproducing the output voltage from a high frequency supply source for a cycloconverter and for removing from the reproduced voltage notches and other distortions which occur in the source output wave as a result of current flow through the impedance of the source.

Still another object is to provide such an improved wave filter arrangement which introduces substantially no phase shift as a result of change of frequency of the supply source.

It is a further object of the invention to provide an improved wave filter arrangement for deriving a replica of the output wave from an electrical device having notches in its output voltage and for replacing the notches in the replica wave.

Another object is to provide an improved filter arrangement for providing a replica of the air gap voltage in an alternating current generator for use in deriving firing signals for a cycloconverter supplied by the generator, whereby notches in the generator output voltage do not affect the firing angles of the cycloconverter SCR's.

SUMMARY OF THE INVENTION

In accordance with the invention, an electrical wave filter arrangement for deriving a replica of the output wave from an electrical power source having notches in its output voltage and for replacing the notches in the replica wave includes a current transformer for providing an output indicative of the source output current, means for deriving a reduced magnitude replica of the source output voltage, and an auxiliary impedance which is a scale model of the source impedance connected across the current transformer secondary winding so that the voltage drop thereacross is additive to the replica voltage. Distortions in the output voltage wave from the source, such as commutation notch voltage drops resulting from current flow through the source impedance, are reproduced in reduced scale by the flow of current transformer secondary current through the auxiliary impedance and are added to the replica voltage so the resultant voltage appearing across the series arrangement of auxiliary impedance and replica voltage deriving means has the notches and distortions eliminated therefrom.

A preferred embodiment of the invention reproduces the sinusoidal so-called voltage behind the subtransient impedance (i.e., the air gap voltage) in an alternating current generator supplying an SCR cycloconverter to eliminate from the replica noise and commutation notches which appear in the generator output voltage as a result of the flow of current through the impedance of the generator when SCR's of the same group connected to different generator phases conduct simultaneously and short the generator terminals. The replica voltage deriving means may be a potential transformer having a turn ratio of $m$, the current transformer may have a turn ratio of $n$, and the auxiliary impedance may be an inductive reactance whose inductance is a scale model of that of the generator phase winding and equal to approximately $n/m$ times the inductance of the generator phase winding.

If the generator is three-phase and has wye connected windings, the primary windings of three potential transformers may be connected in delta line-to-line across the generator output phase busses. The potential transformer secondary windings may also be connected in delta, and three resistances may be connected in star and to the junctions of the potential transformer secondary windings to establish an artificial neutral and derive voltages which are reduced magnitude replicas of the generator phase-to-neutral voltages. A current transformer may be coupled to each generator phase bus, and the parallel arrangement of a current transformer secondary winding and an auxiliary inductance may be connected so that the voltage drop across the auxiliary inductance is additive to the generator phase-to-neutral replica voltage, thereby reproducing the sinusoidal voltages behind the generator subtransient reactances (i.e., the air gap voltages) on a reduced scale.

DESCRIPTION OF THE DRAWING

These and other objects and advantages of the invention will be more readily apparent from the following detailed description when considered in conjunction with the accompanying drawing wherein.

DETAILED DESCRIPTION

Figure 1:
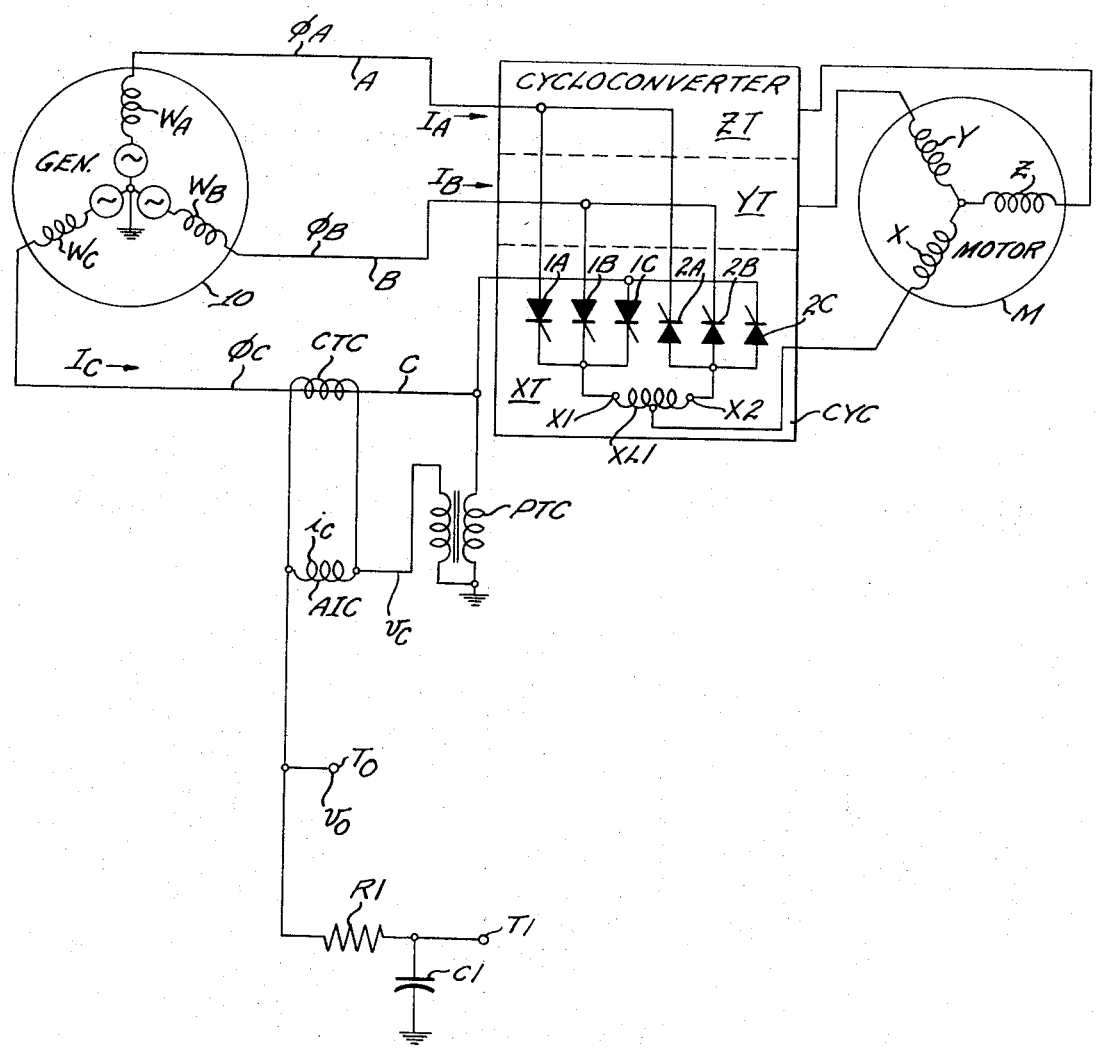
FIG. 1 is a schematic circuit diagram of a polyphase generator supplying a cycloconverter for controlling an electric motor and illustrating an electric wave filter arrangement in accordance with the invention coupled to one generator phase.

A preferred embodiment of the invention schematically illustrated in FIG. 1 reproduces the generator alternating current air gap voltage i.e., the so-called voltage behind the subtransient reactance (shown by the symbol for an A.C. signal source) in a three-phase generator 10 which energizes a three-phase motor M through a cycloconverter CYC (shown in block form) for the purpose of eliminating from the reproduction commutation notches and other distortions in the generator phase voltages $\phi_A$, $\phi_B$ and $\phi_C$ caused by flow of load current through the impedances of the generator phase windings $W_A$, $W_B$ and $W_C$. The air gap voltage which is reproduced may alternatively be identified as the generated voltage after the armature m.m.f. has affected the field flux. FIG. 1 shows only six of the 18 thyristors of cycloconverter CYC, namely, the set XT of six thyristors comprising positive group SCR's 1A, 1B and 1C which supply positive current to motor phase winding X and the negative group of SCR's 2A, 2B and 2C which supply negative current to motor phase winding X.

Figure 2A:
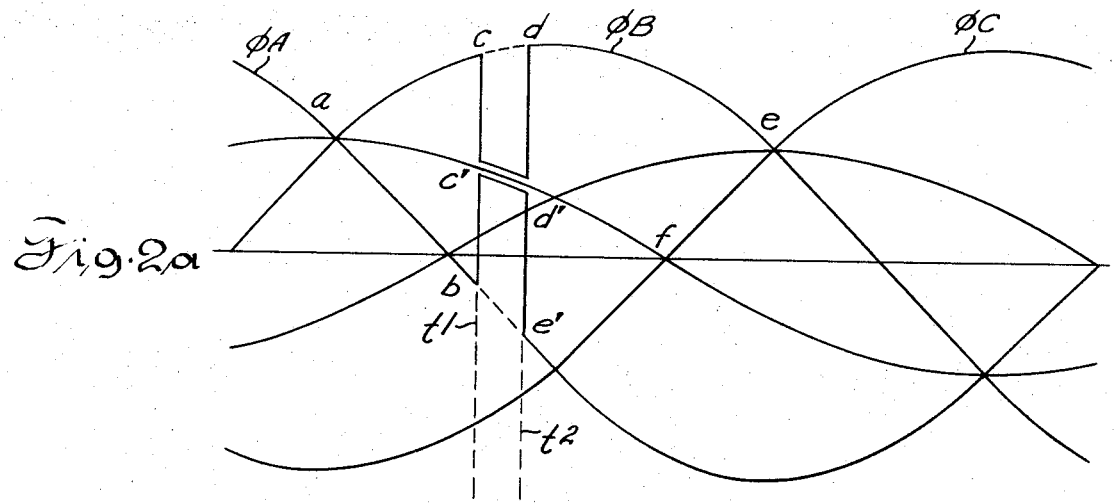
FIG. 2a illustrates two of the output phase voltages from the supply generator of FIG. 1.

FIG. 2a schematically represents the generator output phase voltages $\phi_A$, $\phi_B$ and $\phi_C$. Assuming that positive group SCR 1A connected to generator phase bus A is commutated off at time $t1$ when positive group SCR 1B connected to phase B is gated on, the instantaneous voltage appearing at terminal X1 of the mid-tapped reactor XL1 connected between the positive and negative SCR groups would be that represented by the line $a\ b\ c\ d\ e$. If, however, positive group SCR 1B is gated at time t1 and positive group SCR 1A continues to conduct and is not commutated off until subsequent time $t2$, a line-to-line short circuit is created across generator phase busses A and B by the simultaneously conducting SCR's 1A and 1B.

Figure 2B:
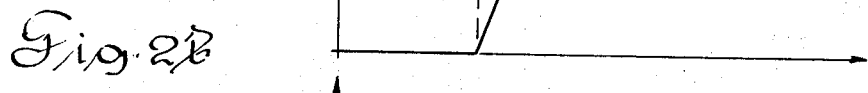
FIGS. 2b and 2c illustrate the current flow through two simultaneously conducting SCR's of the same group connected to different supply generator phases, with FIG. 2b representing the newly gated SCR and FIG. 2c representing the SCR being commutated off.
Figure 2C:
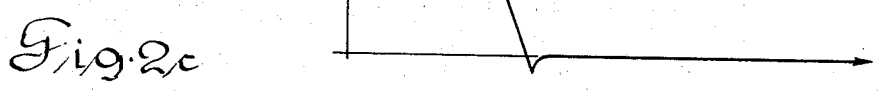

When switching occurs, the load current should be transferred from the SCR 1A which was conducting to the SCR 1B which has just received its gate signal. However, since both SCR's 1A and 1B are assumed to be conducting simultaneously, they cause a line-to-line short circuit of the generator phases A and B. The short circuit current flowing through the impedance of the generator phase windings $W_A$ and $W_B$ cause voltage drops which result in the phase A voltage following the curve $a\ b\ c'\ d'\ e'$ (assuming 1A is commutated off at time $t2$); the phase B voltage $\phi_B$ following the curve $c\ c'\ d'\ d\ e$; and the instantaneous voltage appearing at terminal X1 of reactor XL1 following the curve $c'\ d'\ f$ as long as phases A and B remain shorted. While the current in the newly turned on thyristor 1B is increasing sinusoidally (as shown to be linearly in FIG. 2b), the current in the already conducting thyristor 1A must be decreasing sinusoidally (as shown to be linearly in FIG. 2c). Such short circuit results in a so-called "commutation notch" in the generator voltage which is schematically illustrated as being of square wave configuration (its actual shape depends upon the position of $t1$ and $t2$ relative to the zero crossing points of $\phi_A$ and $\phi_B$) and is superimposed upon the sinusoidal output voltage of the generator. Switching of three motor phases can cause multiple commutation notches per cycle of generator frequency and result in a typical phase-to-neutral voltage such as illustrated in FIG. 2c. The commutation notches can change the firing angles of the cycloconverter SCR's in either the leading or lagging direction and can increase or decrease the cycloconverter output voltage.

FIG. 1 schematically illustrates an electric wave filter arrangement in accordance with the invention in only a single generator phase bus C for the purpose of producing a replica of the generator phase so-called voltage behind the subtransient reactance (i.e., the air gap voltage) so that such replica voltage will not have commutation notches and other distortions which appear in the generator phase output voltage as a result of flow of load current through the impedance of the generator winding. A potential transformer PTC having its primary winding connected to generator phase bus C and a turns ratio m derives in its secondary winding a reduced magnitude replica $v_c$ of the generator phase-to-neutral voltage $\phi_C$, and such replica voltage $v_c$ has commutation notches and other distortions therein resulting from the flow of load current $I_c$ through the impedance of generator phase winding $W_C$.

A current transformer CTC coupled to the generator phase bus C and having a turns ratio n derives in its secondary winding a reduced magnitude facsimile $i_c$ of the load current $I_c$ flowing through generator phase winding $W_C$. An auxiliary impedance AIC connected across the secondary winding of current transformer CTC is a scale model of the generator phase winding impedance. Since the armature leakage reactance of a generator winding $W_C$ is much greater than its effective resistance, auxiliary impedance AIC is preferably an inductance. In the preferred embodiment, the inductance $L_x$ of auxiliary impedance AIC is related to the inductance $L_w$ of generator winding $W_c$ by $$L_x = n/m\ L_w$$

Figure 2D:
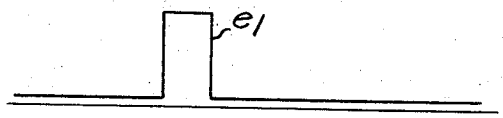
FIG. 2d illustrates a "notch replacement" voltage drop across an auxiliary inductance corresponding to a commutation notch in the generator voltage.
Figure 2E:
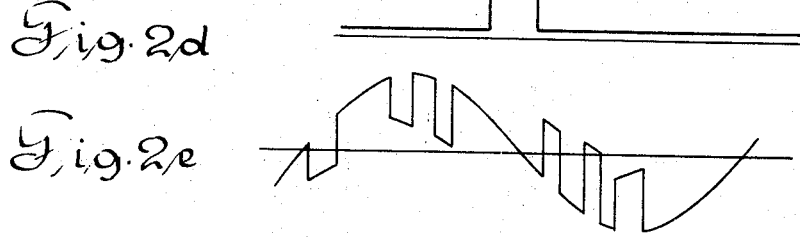
FIG. 2e illustrates a typical generator phase to neutral voltage having commutation notches therein.

Assuming that the current rise through the inductance $L_w$ of generator phase winding $W_c$ is linear (after shorting of the generator terminals by simultaneously conducting SCR's 1A and 1B), the current rise through auxiliary inductance AIC is also linear, and the resulting "notch replacement" voltage $e_1 = -L_x di/dt$ developed across auxiliary inductance AIC is approximately a square wave schematically shown in FIG. 2d which is similar to a commutation notch such as $c\ c'\ d'\ d$ in the generator phase voltage. Of course, the assumed "linear" current increase or decrease during commutation is actually part of a sinusoidal wave.

One terminal of the secondary winding of potential transformer PTC is grounded, and the other terminal is connected to one side of auxiliary impedance AIC so that the reduced magnitude replica voltage $v_c$ is additive to voltage drop $e_1$ across auxiliary impedance AIC in such a manner that the voltage to ground $v_o$ appearing at terminal $T_o$ is essentially a reduced scale reproduction of the sinusoidal generator air gap voltage. The voltage drop across auxiliary inductance AIC reproduces the generator "subtransient" impedance voltage to scale. The scale impedance AIC for removing commutation notches in the replica voltage acts throughout the entire cycle, but has little effect when the rate of change of generator phase current $di/dt$ is low and is most important at the time of high $di/dt$ of generator phase current. It will be appreciated that auxiliary impedance AIC can also be a scale model of the subtransient impedance of any supply source other than a generator ahead of the SCR's, for example, it can be a scale model of the commutating reactance of an electrical line where the source for the cycloconverter SCR's is the electric line, or it could be an imitation of the subtransient reactance of an inverter preceding the SCR's.

Preferably the scale impedance AIC is variable in the same manner as the source subtransient impedance, for example, the inductance of auxiliary impedance AIC should preferably vary with current in the same manner that the generator subtransient reactance changes with current as the iron of the generator saturates so that the scale impedance duplicates the saturation of the machine. The scale impedance AIC can be calibrated in terms of the impedance of the generator, but preferably the scale impedance AIC is selectively adjustable to permit trimming, i.e., manual selection of the value of scale impedance which most closely reproduces the sinusoidal generator air gap voltage and most effectively removes the notches.

It will also be appreciated that a properly calibrated adjustable scale impedance can be utilized to measure the subtransient impedance of the generator or other source preceding the SCR's, e.g., by observing the replica voltage on an oscilloscope and adjusting the scale impedance to the point that maximum notch removal is obtained.

In the event that the sinusoidal replica voltage $v_o$ appearing at terminal $T_o$ still contains some noise or other distortion, the voltage $v_o$ may be applied to a suitable RC wave filter which does not cause substantial phase shift with change of frequency such as a resistance R1 and a capacitor C1 ground in order to produce a "clean" sinusoidal voltage to ground at terminal T1 without introducing significant phase and amplitude variations.

Figure 3:
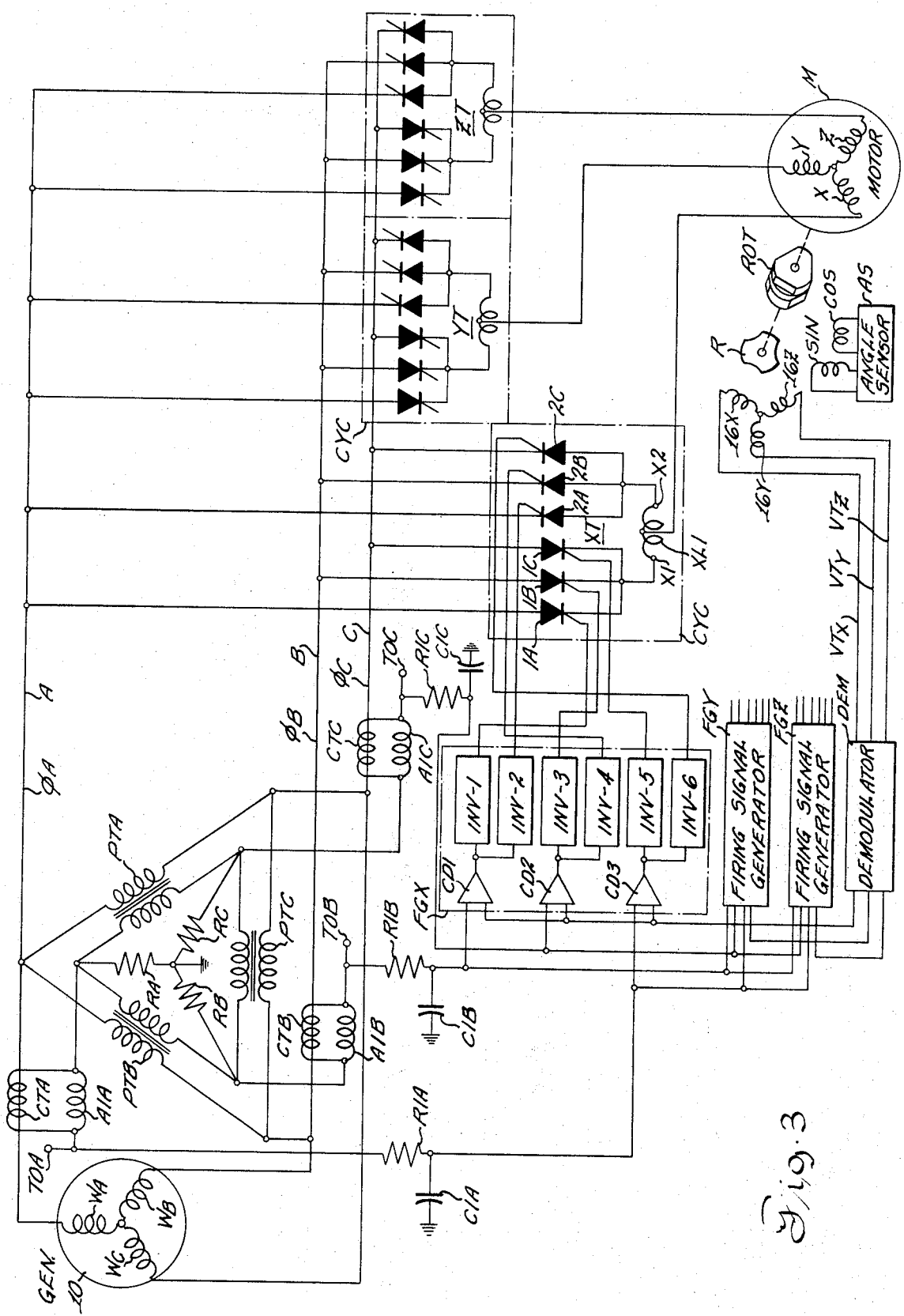
FIG. 3 is a circuit diagram of a three-phase generator supplying a cycloconverter and incorporating a preferred embodiment of the wave filter arrangement of the invention.

FIG. 3 is a circuit diagram incorporating a three-phase electric wave filter arrangement in accordance with the invention and using the same reference numerals as FIG. 1. Generator 10 supplies phase voltages, $\phi_A$, $\phi_B$ and $\phi_C$ over phase busses A, B and C to cycloconverter CYC which controls three-phase motor M. Cycloconverter CYC may comprise 18 thyristors arranged in three sets XT, YT and ZT of six thyristors each of which supplies current to one phase winding X, Y or Z of motor M. The three sets XT, YT and ZT of thyristors are identical and each set is similar to set XT described for the embodiment of FIG. 1 wherein a positive group of SCR's 1A, 1B and 1C having their anodes connected to the generator phase busses A, B and C, respectively, supply positive current to motor winding X, and a negative group of SCR's 2A, 2B and 2C having their cathodes connected to generator phase busses A, B and C, respectively, supply negative current to motor winding X. The commoned cathodes of positive group SCR's 1A, 1B and 1C may be connected to terminal X1 of a midtapped reactor XL1 having its midtap connected to motor winding X, and the commoned anodes of negative group SCR's 2A, 2B and 2C may be connected to the other terminal X2 of reactor in the manner disclosed in U.S. Pat. No. 3,577,590 to Ringland et al. having the same assignee as this invention.

The gating signals for the SCR's may be generated by firing signal generators FGX, FGY and FGX shown in block form as disclosed in said patent. The three firing signal generators FGX, FGY and FGZ are similar and only signal generator FGX will be discussed which includes three zero crossing detectors CD1, CD2 and CD3, each of which receives a replica of one high frequency generator phase voltage signal $\phi_A$, $\phi_B$, or $\phi_C$ and a demodulated low voltage reference signal $VT_x$ from an angle sensor AS and mixes such signals and detects positive-going and negative-going crossings of the resultant signal to derive gating signals for a pair of SCR's of cycloconverter CYC.

As disclosed in the aforesaid patent, angle sensor AS has a pair of quadrature exciting windings SIN and COS which are energized by signals of selectively variable magnitude, three output phase windings 16X, 16Y and 16Z displaced 120 degrees apart, and a ferromagnetic rotor R coupled to the rotor ROT of motor M. Angle sensor AS vectorially adds the signals applied to exciting windings SIN and COS and induces carrier frequency voltages $VT_x$, $VT_y$ and $VT_z$ in output windings 16X, 16Y and 16Z, respectively, which are the resultant of the vector addition are are cyclically modulated by ferromagnetic rotor R at the frequency of rotation of motor rotor ROT. The carrier frequency signals $VT_x$, $VT_y$ and $VT_z$ are demodulated in a discriminator DEM into signals at the frequency of rotation of motor rotor ROT, and the quadrature exciting windings SIN and COS of the angle sensor AS permit shifting of the phase of the output voltages $VT_x$, $VT_y$ and $VT_z$ relative to the position of motor rotor ROT.

Crossing detector CD1 may receive a replica of generator phase voltage $\phi_B$ and the demodulated motor frequency voltage $VT_x$ from angle sensor AS as inputs and mix them and also detect positive-going and negative-going zero crossings of the resultant signal to derive gating signals for SCR's 1A and 2A. Similarly, crossing detector CD2 may receive a replica of generator phase voltage $\phi_C$ and demodulated low frequency reference signal $VT_x$ from angle sensor AS and mix them and then detect zero crossings of the resultant signal to derive firing signals for SCR's 1B and 2B of cycloconverter CYC. However, commutation notches and other distortions exist in the generator phase voltages $\phi_A$, $\phi_B$ and $\phi_C$ which would change the firing angles of the SCR's, and the filter arrangement shown in FIG. 3 produces replicas of the sinusoidal generator phase air gap voltages, i.e., without the commutation notches which appear in the phase voltages $\phi_A$, $\phi_B$ and $\phi_C$, and the replica voltages are then combined (instead of generator voltages $\phi_A$, $\phi_B$, $\phi_C$) with the demodulated low frequency reference signal $VT_x$ in crossing detectors CD1, CD2 and CD3 to derive the firing signals for the SCR's of the cycloconverter.

Three potential transformers PTA, PTB and PTC have their primary windings connected in delta to measure the phase-to-phase output voltages of generator 10, and the potential transformer secondary windings are also connected in delta to generate reduced magnitude replicas of the generator phase-to-phase voltages. The delta connection of the potential transformers is particularly suitable when the neutral point of the generator is inaccessible. Three equal resistances RA, RB and RC are connected in wye to establish an artificial neutral, and each resistor RA, RB and RC is connected to the junction of two potential transformer secondary windings so that reduced magnitude replicas of the generator phase-to-neutral voltages $\phi_A$, $\phi_B$ and $\phi_C$ are developed across resistances RA, RB and RC.

Three current transformers CTA, CTB and CTC are coupled to the generator phase busses A, B and C, respectively, and auxiliary inductances AIA, AIB and AIC are connected across the secondary windings of current transformers CTA, CTB and CTC, respectively, which are scale models of the inductances of the generator phase windings $W_A$, $W_B$ and $W_C$, respectively. Each auxiliary impedance has an inductance $L_x$ which is approximately equal to $n/m$ times that of the generator phase winding, where $n$ is the turns ratio of the current transformer and $m$ is the turns ratio of the potential transformer.

The voltages derived across auxiliary inductances AIA, AIB and AIC are the reproduced "replacement notch" voltages representing the internal generator drop across the inductance of the corresponding generator phase winding caused by the flow of load current therethrough. The auxiliary inductances AIA, AIB and AIC are connected to the resistances RA, RB and RC across which the replicas of the generator phase-to-neutral voltages are derived so that the "replacement notch" voltage drops (across AIA, AIB and AIC) are added to the replica potentials of the generator phase-to-neutral voltages (derived across RA, RB and RC) in such a manner that commutation notches are eliminated from the resultant replica voltages appearing at terminals TOA, TOB and TOC. These voltages appearing at terminals TOA, TOB and TOC are replicas of the sinusoidal generator phase voltages behind the subtransient reactances and are passed through conventional RC filters R1A–C1A, R1B–C1B and R1C–C1C to remove any remaining distortion or noise before they are supplied as inputs to crossing detectors CD1, CD2 and CD3, respectively, of firing signal generator FGX which derive gating signals for the SCR's of thyristor set XT. Inasmuch as commutation notches and other distortions do not appear in such facsimiles of the generator phase air gap voltages, phase shift in the firing angles of the SCR's is substantially eliminated.

In alternative embodiments, the reduced magnitude replicas of the generator phase-to-neutral voltages such as $v_c$ may be derived by voltage dividers connected between each phase bus and ground. Further, it will be appreciated that other current sensing means such as a Hall generator could be utilized in place of a stepdown current transformer to derive a reduced magnitude replica of the current flowing through the impedance of a generator winding. Still further, it will be appreciated that addition of the replica voltage and the notch replacement voltage can be effected by other means such as operational amplifier.

It will also be appreciated that the disclosed arrangement can be used with other types of current rectifying components than solid-state thyristors, for example, with mercury arc valves.

While only a single embodiment of the invention has been illustrated and described, it should be understood that we do not intend to be limited to the single embodiment for many modifications and variations will be obvious to those skilled in the art.

The embodiments of the invention in which an exclusive property or privilege is claimed are defined as follows:

1. In an electrical wave filter arrangement for deriving a replica of the output voltage from an electrical power source and for removing from the replica voltage commutation notches and other distortions which appear in the source output voltage as a result of flow of electrical current through the impedance of said source, the combination of
   means for deriving a voltage which is a replica of the output voltage from said power source,
   current sensing means for producing an output indicative of the output current from said power source, and
   an auxiliary impedance which is a scale model of said impedance of said power source coupled across the output of said current sensing means so that the voltage drop thereacross is additive to said replica voltage.

2. In an electrical wave filter arrangement in accordance with claim 1 wherein said power source is an alternating current generator which supplies power to a bank of controlled rectifiers, said wave filter arrangement reproduces the air gap voltage of said generator, and the inductance of said auxiliary impedance is a reduced scale model of the subtransient reactance of said generator.

3. In an electrical wave filter arrangement in accordance with claim 1 wherein said current sensing means is a stepdown current transformer and said auxiliary impedance is connected across the secondary of said current transformer.

4. In an electrical wave filter arrangement in accordance with claim 3 wherein said current transformer has a turns ratio of $n$ to 1, said replica voltage deriving means is a stepdown potential transformer having a turns ratio of $m$ to 1, and said auxiliary impedance is an inductive reactance whose inductance is approximately equal to $n/m$ times the inductance of said power source.

5. In an electrical wave filter arrangement in accordance with claim 1 wherein said power source includes a magnetic element and the impedance of said power source varies as a function of the magnitude of said electrical current flow therethrough, and wherein said auxiliary impedance is an inductive reactance including a magnetic element and whose impedance varies as a function of the magnitude of electrical current flow therethrough in approximately the same manner as said power source.

6. In an electrical wave filter arrangement in accordance with claim 1 wherein said auxiliary impedance is an inductive reactance whose inductance is selectively adjustable.

7. In an electrical wave filter arrangement for reproducing the input voltage to an electrical device possessing impedance in order to eliminate from the reproduction distortions appearing in the output wave from said device as a result of current flow through the impedance of said device, the combination of
- means for deriving a voltage which is a replica of the output voltage from said device,
- current sensing means for producing an output indicative of the current flowing through said device, and
- an auxiliary impedance coupled across the output of said current sensing means and connected so that the voltage drop thereacross is additive to said replica voltage, whereby distortions are eliminated from the potential appearing across the series arrangement of said auxiliary impedance and said replica voltage deriving means.

8. In an arrangement in accordance with claim 7 wherein said auxiliary impedance is a reduced scale model of the impedance of said electrical device.

9. In an arrangement in accordance with claim 8 wherein said current sensing means is a stepdown current transformer and said auxiliary impedance is an inductor coupled across the secondary winding of said current transformer and whose inductance is a function of both the turns ratio $n$ of said current means and the inductance of said electrical device.

10. In an arrangement in accordance with claim 9 wherein the magnitude of said replica voltage is approximately $1/m$ that of said output voltage from said device and the inductance of said auxiliary inductor is approximately equal to $n/m$ times said inductance of said electrical device.

11. In an arrangement in accordance with claim 9 wherein said means for deriving said replica voltage is a potential transformer having a turns ratio of approximately $m$ to 1.

12. In an electrical filter arrangement in accordance with claim 7 wherein said device is an alternating current electrical power source for a bank of controlled rectifiers and said auxiliary impedance is a reduced scale model of the impedance of said power source.

13. In an electrical filter arrangement in accordance with claim 12 wherein said electrical device is an alternating current generator, said filter arrangement reproduces the air gap voltage in said generator, and said auxiliary impedance in a scale model of the subtransient reactance of said generator.

14. In an electrical filter arrangement in accordance with claim 13 wherein said auxiliary impedance includes a magnetic element and the inductance of said auxiliary impedance varies as a function of the magnitude of current flow therethrough in the same manner that said subtransient reactance of said generator varies as a function of the magnitude of generator current.

15. An electrical wave filter arrangement for reproducing the voltage behind the subtransient reactance of an alternating current generator comprising, in combination,
- stepdown current transformer means having a secondary winding for providing an output indicative of the output current from said generator,
- potential deriving means for generating a voltage which is a replica of the output voltage from said generator, and
- an auxiliary inductor connected across said secondary winding so that the voltage drop thereacross is additive to said replica voltage, the inductance of said auxiliary inductor being a scale model of the inductance of the winding of said generator, whereby distortions are eliminated from the reproduction voltage.

16. An electrical wave filter arrangement in accordance with claim 15 wherein said current transformer has a turns ratio of $n$, said potential deriving means generates a voltage whose magnitude is equal to approximately $1/m$ that of said generator output voltage, and the inductance of said auxiliary inductor is approximately equal to $n/m$ times the inductance of said generator winding.

17. An electrical filter arrangement for reproducing the voltage behind the subtransient reactance of a polyphase alternating current generator having star connected stator phase windings and supplying an SCR cycloconverter through output phase busses comprising, in combination,
- a plurality of stepdown current transformers each of which is coupled to one of said output phase busses and has a secondary winding,
- a plurality of stepdown potential transformer means for deriving voltages which are reduced magnitude replicas of the phase-to-neutral output voltages of said generator, and
- a plurality of auxiliary inductors each of which is a reduced scale model of the inductance of a generator stator phase winding and is connected across said secondary winding of one of said current transformers so that the voltage drop thereacross is additive to the replica voltage derived by one of said potential transformer means, whereby any commutation notches appearing in said generator output voltages are eliminated in the reduced scale reproduction voltages appearing from one side of each auxiliary inductor to said neutral.

18. An electrical filter arrangement in accordance with claim 17 wherein the turns ratio of each said current transformer is $n$, the turns ratio of each said potential transformer means is $m$, and the inductance of each auxiliary inductor is approximately equal to $n/m$ times the inductance of a phase winding of said generator.

19. An electrical filter arrangement in accordance with claim 18 wherein said generator is three phase and each said potential transformer means has a primary winding connected across a pair of said generator phase busses, the primary windings of said plurality of potential transformer means are connected in delta and the secondary windings thereof are also connected in delta, and including three resistances connected in wye, each junction between potential transformer secondary windings being connected to one side of one of said auxiliary inductors and also to one side of one of said resistances.

* * * * *